United States Patent [19]

Wick

[11] 4,044,533
[45] Aug. 30, 1977

[54] LAWN MOWER BLADE CLUTCH AND BRAKE

[75] Inventor: Gerald H. Wick, Galesburg, Ill.

[73] Assignee: Outboard Marine Corporation, Waukegan, Ill.

[21] Appl. No.: 690,632

[22] Filed: May 27, 1976

[51] Int. Cl.$^2$ .......................................... A01D 69/10
[52] U.S. Cl. ..................... 56/11.3; 56/10.5; 192/17 R; 188/77 W
[58] Field of Search ................ 56/11.3, 10.5; 188/77 R, 77 W; 192/12 R, 17 R

[56] References Cited

U.S. PATENT DOCUMENTS

| 2,167,171 | 7/1939 | Dodge | 188/77 R |
| 2,875,858 | 3/1959 | Dunham | 188/77 R |
| 3,026,665 | 3/1962 | Hoff | 188/77 R |
| 3,228,177 | 1/1966 | Coates | 56/10.5 |
| 3,253,391 | 5/1966 | Meldahl | 56/11.3 |
| 3,290,871 | 12/1966 | Haas | 56/10.5 |
| 3,461,994 | 8/1969 | Dallman et al. | 192/17 R X |

Primary Examiner—Russell R. Kinsey
Attorney, Agent, or Firm—Michael, Best & Friedrich

[57] ABSTRACT

Disclosed herein is a lawn mower comprising a blade housing supported for travel over the ground, a drive shaft mounted for rotation by the blade housing and including thereon a clutch drum, an engine drivingly connected to the drive shaft for rotation thereof, a cutter blade located in the blade housing and mounted for rotation coaxially with and relative to the drive shaft, a clutch shoe connected to the cutter blade for common rotation therewith and for movement relative to a position of engagement with the clutch drum, a spring urging the clutch shoe into the position of engagement, a brake surface fixed to the clutch shoe, and a brake member movable between a first position wherein the brake member is spaced from the brake surface, and a second position wherein the brake member engages the brake surface to brake rotation of the cutter blade and to displace the clutch shoe from the position of engagement against the action of the spring.

20 Claims, 5 Drawing Figures

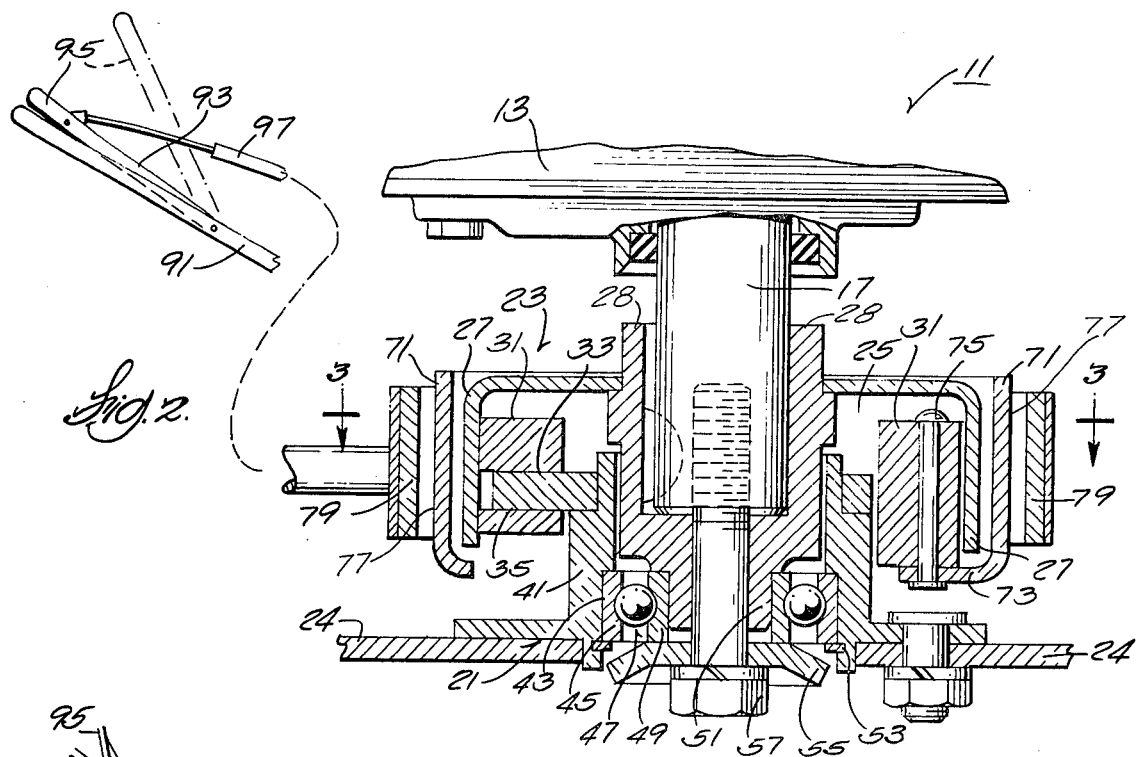
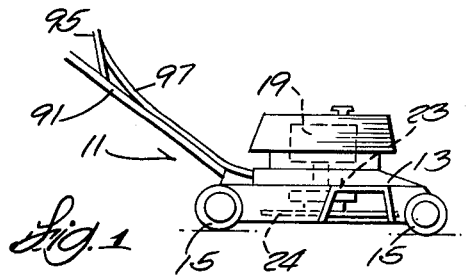
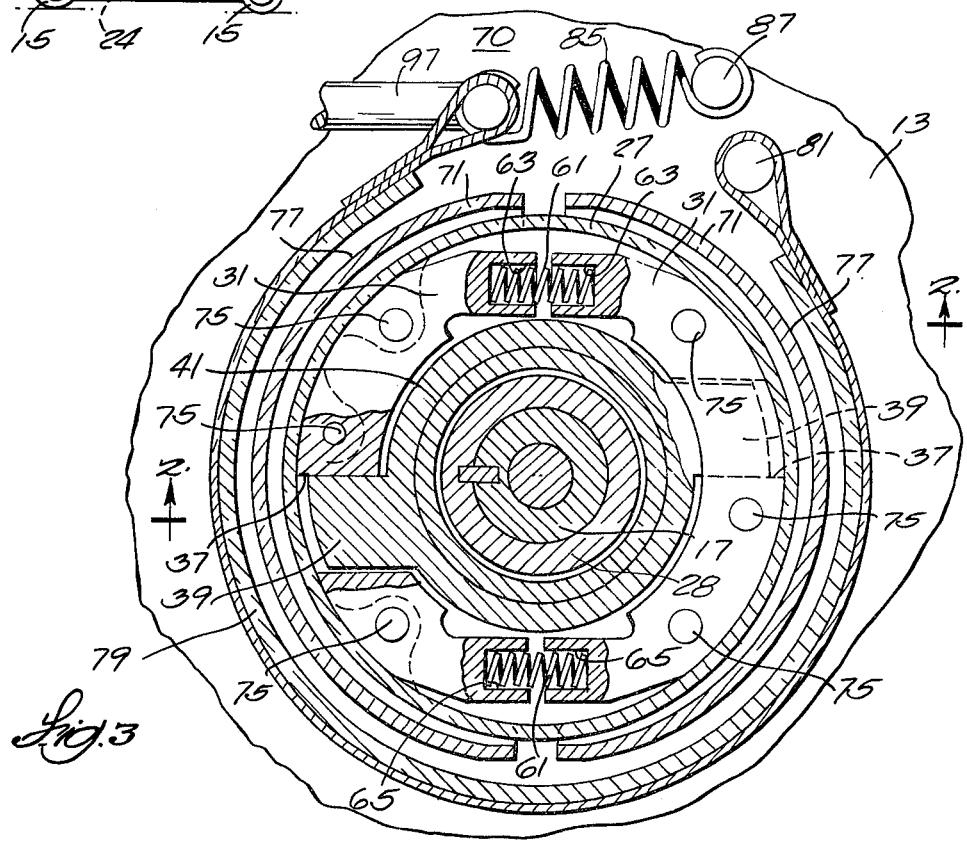

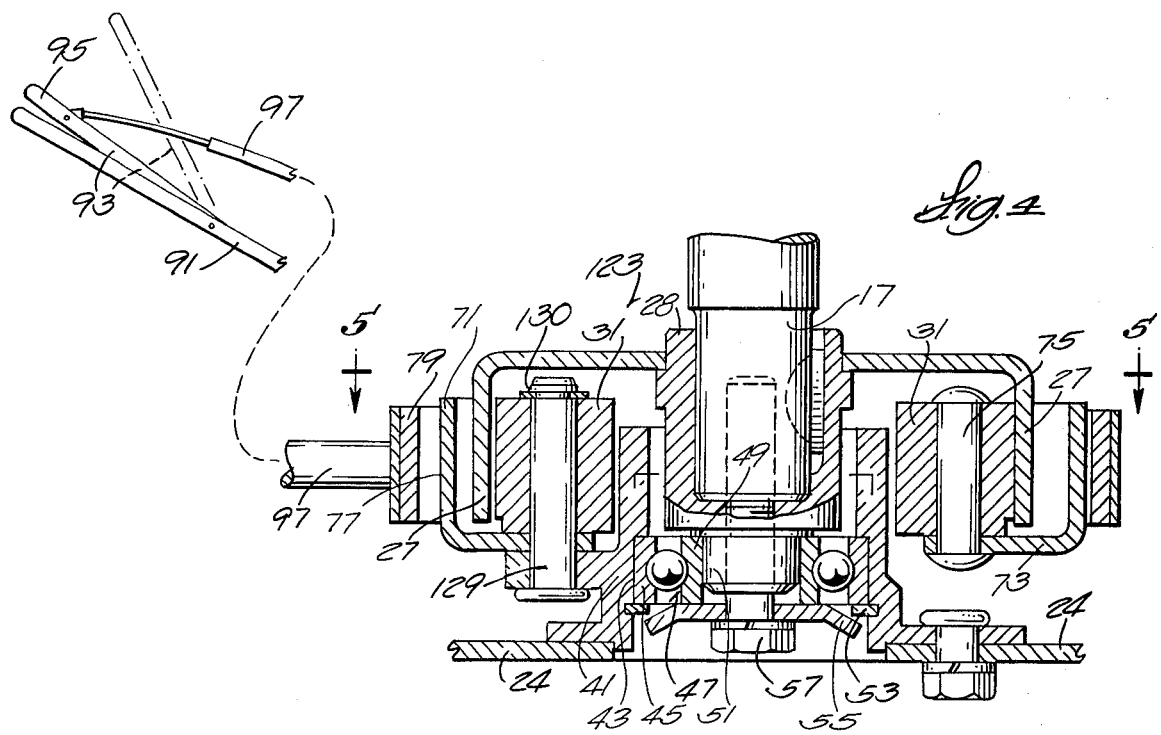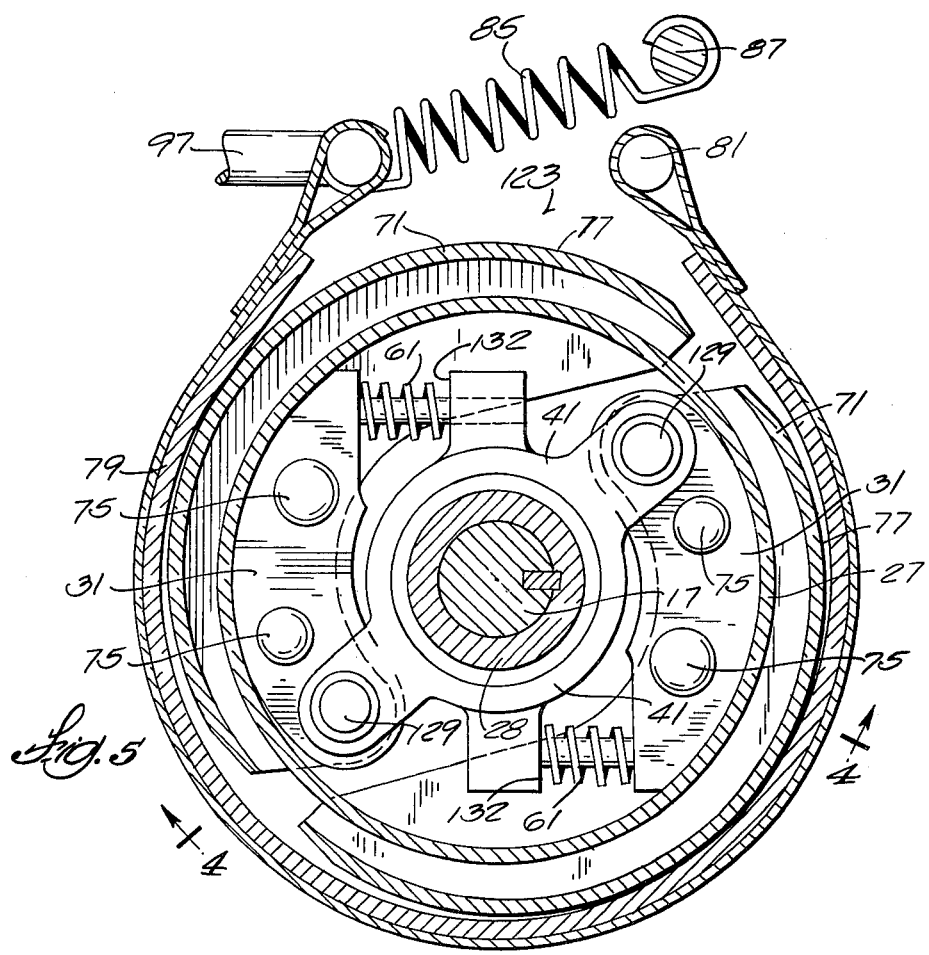

LAWN MOWER BLADE CLUTCH AND BRAKE

BACKGROUND OF THE INVENTION

The invention relates generally to rotary lawn mowers and more particularly to rotary lawn mowers including a clutch operable to engage and disengage a cutter blade with respect to a prime mover. Still more particularly, the invention relates to rotary lawn mowers in which cutter blade rotation is simultaneously braked incident to disengagement of the clutch.

Attention is directed to the Hoff U.S. Pat. No. 3,026,665 issued Mar. 27, 1962 and to the Meldahl U.S. Pat. No. 3,253,391 issued May 31, 1966.

SUMMARY OF THE INVENTION

The invention provides a lawn mower comprising a blade housing supported for travel over the ground, a drive shaft mounted for rotation by the blade housing and including thereon, a clutch drum, an engine drivingly connected to the drive shaft, a clutch shoe connected to the cutter blade for common rotation therewith and for movement relative to a position of engagement with the clutch drum, biasing means urging the clutch show into the position of engagement, a brake surface fixed to the clutch shoe, and a brake member movable between a first position wherein the brake member is spaced from the brake surface, and a second position wherein the brake member engages the brake surface to brake rotation of the cutter blade and to displace the clutch shoe from the position of engagement against the action of the biasing means.

The invention also provides a combined brake and clutch mechanism comprising a drive member mounted for rotation and including thereon a clutch drum, a driven member carried for rotation coaxially with and relative to the drive member, a clutch shoe connected to the driven member for common rotation therewith and for movement relative to a position of engagement with the clutch drum, biasing means for urging the clutch shoe toward the position of engagement, a brake surface fixed to the clutch shoe, and a brake member movable between a first position wherein th brake member is spaced from the brake surface, and a second position wherein the brake member engages the brake surface to brake rotation of the driven member and to displace the clutch shoe from the position of engagement against the action of the biasing means.

In one embodiment of the invention, there is also provided means biasing the brake member to the second position.

In one embodiment of the invention, there is also provided manual means for overpowering the brake member biasing means so as to displace the brake member to the first position.

In one embodiment of the invention, there is also provided a second clutch shoe located in diametrically opposite relation to said first mentioned clutch shoe and connected to the cutter blade for common rotation therewith and for movement relative to a position of engagement with the clutch drum, and the biasing means also biases the second clutch shoe to a position of engagement with the clutch drum and comprises a pair of springs each acting, at one end, against the first mentioned clutch shoe and each acting, at the other end, against the second clutch shoe.

In one embodiment of the invention, the clutch drum is located radially outwardly of the clutch shoe and extends in generally parallel relation to the axis of drive shaft rotation and the brake surface is located radially outwardly of and in generally parallel relation to the clutch drum. It is preferred that the brake surface constitute one leg of an L-shaped member which includes a second leg extending radially inwardly and fastened to the clutch shoe.

One of the principal features of the invention is the provision of a lawn mower including a combined clutch and brake mechanism which serves simultaneously to brake the cutter blade and to disengage a centrifugal clutch driving the cutter blade from a prime mover.

Another of the principal features of the invention is the provision of a lawn mower including a centrifugal clutch which drivingly connects a prime mover to a cutter blade and which includes a clutch shoe connected to the cutter blade and biased by a spring into engagement with a clutch drum driven by the prime mover, together with a brake surface connected to the clutch shoe and engagable by a brake band so as simultaneously to brake cutter blade rotation and disengage the clutch shoe from the clutch drum against the action of the spring.

Another of the principal features of the invention is the provision of a lawn mower including a mechanism for automatically disengaging a combined clutch and brake mechanism, as specified in either of the two preceding paragraphs, in the absence of the maintenance of an operating lever adjacent to a handle bar by an operator.

Other features and advantages of the embodiments of the invention will become known by reference to the following general description, claims, and appended drawings.

THE DRAWINGS

FIG. 1 is an elevational view of a lawn mower embodying various of the features of the invention.

FIG. 2 is an enlarged view, partially schematic and partially in section, of a combined clutch and brake mechanism embodied in the lawn mower shown in FIG. 1.

FIG. 3 is a sectional view taken generally along line 3—3 of FIG. 2.

FIG. 4 is an enlarged view, partially schematic and partially in section, of another embodiment of a combined clutch and brake mechanism which can be incorporated in the lawn mower shown in FIG. 1.

FIG. 5 is a sectional view taken generally along line 5—5 of FIG. 4.

Before explaining the embodiments of the invention in detail, it is to be understood that the invention is not limited in its application to the details of construction and the arrangement of the components set forth in the following description or illustrated in the drawings. The invention is capable of other embodiments and of being practiced and carried out in various ways. Also it is to be understood that the phraseology and terminology employed herein is for the purpose of description and should not be regarded as limiting.

GENERAL DESCRIPTION

Shown in the drawings is a lawn mower 11 including a blade housing 13 which can be supported for travel over the ground in any suitable way, as for instance, by being slung under a tractor or forming a part of a riding mower.

In the illustrated construction, the blade housing 13 is supported by a plurality of wheels 15.

Rotatably supported by the blade housing 13 is a drive shaft or member 17 which can be driven in various ways, as for instance, by a remote engine. In the illustrated construction, the drive shaft 17 constitutes the lower end portion of the crank shaft of an internal combustion engine 19 mounted on the blade housing 13.

Located within the cutter blade housing 13 for relative rotation coaxially with the drive shaft 17, is a cutter blade assembly or driven member 21 which includes a cutter blade 24 rotating within the blade housing 13 and which is connected to the drive shaft 17 by a combined clutch and brake mechanism 23.

More specifically, the illustrated combined clutch and brake mechanism 23 includes a centrifugal clutch 25 including a clutch drum 27 and connected hub 28 which are keyed to and extend fixedly from the drive shaft 17.

Engagable with the clutch drum 27 are one or more clutch shoes 31 (two diametrically oppositely located shoes in the disclosed construction) which clutch shoes 31 are part of the cutter blade assembly 21 and are guided for radial movement by respective upper and lower guide surfaces 33 and 35 respectfully extending radially outwardly from a hub 41.

Means are provided for rotating the clutch shoes 31 in common with the cutter blade 24 while permitting radially inward and outward movement of the clutch shoes 31 relative to positions of engagement with the clutch drum 27. In the illustrated construction, such means comprises formation of each of the clutch shoes 31 with radially inwardly open notches 37 which receive drive tangs 39 extending from the hub 41 which is fixed to the cutter blade 24 and which forms a part of the cutter blade assembly 21.

As already indicated, means are provided for rotatably mounting the cutter blade 24 (and connected parts) within the blade housing 13 for coaxial rotation relative to the drive shaft 17. In the illustrated construction, the hub 41 includes a counterbore 43 which receives one race 45 of a bearing 47 having a second race 49 engaged with a shoulder 51 on the hub 28. The bearing race 45 is retained within the hub 41 by a retaining ring 53 while the bearing race 49 is retained on the shoulder 51 on the hub 28 by a washer 55 and a headed bolt and lockwasher 57 which is axially threaded into the drive shaft 17 after passing through the hub 28.

Means are provided for biasing the clutch shoes 31 into engagement with the clutch drum 27 so as to effect rotation of the cutter blade 24 in response to rotation of the drive shaft 17. In the illustrated construction, such means comprises a pair of springs 61 which, at one end, are received in recesses 63 in one of the end portions of the clutch shoes 31 and which, at the other end, are received in recesses 65 in the other of the end portions of the clutch shoes 31.

Means in the form of a brake mechanism 70 are provided for braking the cutter blade 24 against the rotation and for simultaneously overpowering the clutch shoe biasing means so as to disengage the clutch shoes 31 from the clutch drum 27. In the illustrated construction, such means comprises respective brake elements 71 which are respectively fixed to each of the clutch shoes 31 and which are generally of L shape including one leg 73 secured to the associating clutch shoe 31 by one or more fasteners 75 and a second generally semicylindrical leg or braking surface 77 which extends in generally parallel and radially outwardly relation to the clutch drum 27. The means for braking the cutter blade 24 also includes a brake band or member 79 which is movably carried, at one end thereof, on a fixed pivot 81 extending from the blade housing 13 and which extends in generally encircling, radially outwardly adjacent relation to the braking legs 77.

The brake band 79 is movable between a first position spaced from the braking legs or braking surfaces 77 so as to permit unhindered rotation of the cutter blade 24 and a second position engaging the braking legs or braking surfaces 77 so as to brake rotation of the cutter blade 24 and to simultaneously displace the clutch shoes 31 radially inwardly against the action of the clutch shoe biasing means or springs 61 and out of engagement with the clutch drum 27.

Means are provided for biasing the brake band 79 to the position braking rotation of the cutter blade 24 and displacing the clutch shoes 31 away from the clutch drum 27. In the illustrated construction, such means comprises a helical spring 85 connected, at one end thereof, to an anchor 87 extending from the blade housing 13 and, at the other end thereof, to the other or free end of the brake band 79.

The lawn mower 11 also includes means for steering thereof such as, for instance, the handle bar of a riding mower. In the illustrated construction, such means includes a handle 91 extending upwardly and rearwardly from the blade housing 13.

Means are provided for manually over-riding the brake band biasing means. In the illustrated construction, such means comprises a hand operated lever 93 which is movably mounted on the handle 91 and which includes a hand operated part 95 movable between a position adjacent to the handle 91 and a position spaced from the handle 91. The over-riding means also includes a linkage 97 connecting the lever 93 to the brake band 79 such that the spring 85 is also effective to locate the hand operated part 95 in the position spaced from the handle 91. Thus, whenever the hand operated part 95 is not held by the operator against or adjacent to the handle 91, the combined clutch and brake mechanism 23 will operate to disengage the clutch 25 and brake rotation of the cutter blade 24 notwithstanding engine rotation. Furthermore the engine 19 can be started without causing rotation of the cutter blade 24 when the hand operated lever part 95 is located in the spaced position.

Shown in FIG. 4 is another embodiment of a combined clutch and brake mechanism 123 which is similar to that shown in FIGS. 2 and 3 and which can be incorporated in the lawn mower 11 in lieu of the combined clutch and brake mechanism 23. The components of the combined clutch and brake mechanism 123 shown in FIGS. 4 and 5 which are similar to the components of the combined clutch and brake mechanism 23 shown in FIGS. 2 and 3 are designated by the same reference numerals.

The combined clutch and brake mechanism 123 shown in FIGS. 4 and 5 primarily differs from the construction shown in FIGS. 2 and 3 in that the clutch shoes 31 are carried by the hub 41 about pivots in the form of pins 129 for movement of the clutch shoes 31 to and from the clutch drum engaging position. Retainer rings 130 are snap fitted onto the pins 129 to prevent movement of the clutch shoes 31 axially of the pins 129.

In addition, the springs 61 which bias the clutch shoes 31 into engagement with the clutch drum 27 are engaged, at one end, against the free end of the clutch shoes 31 and, at the other end, against abutments 132 on the hub 41.

The operation of the combined clutch and brake mechanism 123 shown in FIGS. 4 and 5 is essentially similar to that of the combined clutch and brake mechanism shown in FIGS. 2 and 3 with the exception that the clutch shoes 31 pivot outwardly as compared to translating outwardly.

Various of the features of the invention are set forth in the following claims.

What is claimed is:

1. A lawn mower comprising a blade housing supported for travel over the ground, a drive shaft mounted for rotation by said blade housing and including thereon a clutch drum, an engine drivingly connected to said drive shaft for rotation thereof, a cutter blade located in said blade housing and mounted for rotation coaxially with and relative to said drive shaft, a clutch shoe connected to said cutter blade for common rotation therewith and for movement relative to a position of engagement with said clutch drum, biasing means urging said clutch shoe into said position of engagement, a brake surface fixed to said clutch shoe, and a brake member movable between a first position wherein said brake member is spaced from said brake surface, and a second position wherein said brake member engages said brake surface to brake rotation of said cutter blade and to displace said clutch shoe from said position of engagement against the action of said biasing means.

2. A lawn mower in accordance with claim 1 and further including means biasing said brake member to said second position.

3. A lawn mower in accordance with claim 2 and further including manual means for overpowering said brake member biasing means so as to displace said brake member to said first position.

4. A lawn mower in accordance with claim 1 wherein said cutter blade is supported for rotation from said drive shaft.

5. A lawn mower in accordance with claim 1 wherein said clutch shoe is connected to said cutter blade for pivotal movement relative to said cutter blade.

6. A lawn mower in accordance with claim 5 wherein said cutter blade carries thereon an abutment and wherein said biasing means comprises a spring acting between said abutment and said clutch shoe.

7. A lawn mower in accordance with claim 1 wherein said clutch shoe is connected to said cutter blade for translatory movement relative thereto.

8. A lawn mower in accordance with claim 7 and further including a second clutch shoe located in diametrically opposite relation to said first mentioned clutch shoe and connected to said cutter blade for common rotation therewith and for movement relative to a position of engagement with said clutch drum, and wherein said biasing means also biases said second clutch shoe to a position of engagement with said clutch drum and comprises a pair of springs acting, at one end, against said first mentioned clutch shoe and acting, at the other end, against said second clutch shoe.

9. A lawn mower in accordance with claim 1 wherein said clutch drum is located radially outwardly of said clutch shoe and extends in generally parallel relation to the axis of drive shaft rotation and wherein said brake surface is located radially outwardly of and in generally parallel relation to said clutch drum.

10. A lawn mower in accordance with claim 9 wherein said brake surface constitutes one leg of an L shaped member including a second leg extending radially inwardly and fastened to said clutch shoe.

11. A combined brake and clutch mechanism comprising a drive member mounted for rotation and including thereon a clutch drum, a driven member carried for rotation coaxially with and relative to said drive member, a clutch shoe connected to said driven member for common rotation therewith and for movement relative to a position of engagement with said clutch drum, biasing means for urging said clutch shoe toward said position of engagement, a brake surface fixed to said clutch shoe, and a brake member movable between a first position wherein said brake member is spaced from said brake surface, and a second position wherein said brake member engages brake surface to brake rotation of said driven member and to displace said clutch shoe from said position of engagement against the action of said biasing means.

12. A combined brake and clutch mechanism in accordance with claim 11 and further including means biasing said brake member to said second position.

13. A combined brake and clutch mechanism in accordance with claim 12 and further including manual means for overpowering said brake member biasing means so as to displace said brake member to said first position.

14. A lawn mower in accordance with claim 11 wherein said driven member is supported for rotation from said drive member.

15. A combined brake and clutch mechanism in accordance with claim 11 wherein said clutch shoe is connected to said driven member for pivotal movement relative to said driven member.

16. A combined brake and clutch mechanism in accordance with claim 15 wherein said driven member carries thereon an abutment and wherein said biasing means comprises a spring acting between said abutment and said clutch shoe.

17. A combined brake and clutch mechanism in accordance with claim 11 wherein said clutch shoe is connected said driven member for translatory movement relative thereto.

18. A combined brake and clutch mechanism in accordance with claim 17 and further including a second clutch shoe located in diametrically opposite relation to said first mentioned clutch shoe and connected to said driven member for common rotation therewith and for movement relative to a position of engagement with said clutch drum, and wherein said biasing means also biases said second clutch shoe to a position of engagement with said clutch drum and comprises and pair of springs acting, at one end, against said first mentioned clutch shoe and acting, at the other end, against said second clutch shoe.

19. A combined brake and clutch mechanism in accordance with claim 11 wherein said clutch drum is located radially outwardly of said clutch shoe and extends in generally parallel relation to the axis of drive shaft rotation and wherein said brake surface is located radially outwardly of and in generally parallel relation to said clutch drum.

20. A combined brake and clutch mechanism in accordance with claim 19 wherein said brake surface constitutes one leg of an L shaped member including a second leg extending radially inwardly and fastened to said clutch shoe.

* * * * *

UNITED STATES PATENT AND TRADEMARK OFFICE
CERTIFICATE OF CORRECTION

PATENT NO. : 4,044,533

DATED : August 30, 1977

INVENTOR(S) : Gerald H. Wick

It is certified that error appears in the above-identified patent and that said Letters Patent are hereby corrected as shown below:

Column 1, line 25  "show" should be ---shoe---.

Column 1, line 43  "th" should be ---the---.

Column 6, line 17  after the word "engages", insert ---said---.

Signed and Sealed this

Fifth Day of December 1978

[SEAL]

Attest:

RUTH C. MASON
Attesting Officer

DONALD W. BANNER
Commissioner of Patents and Trademarks

Notice of Adverse Decision in Interference

In Interference No. 100,191, involving Patent No. 4,044,533, G. H. Wick, LAWN MOWER BLADE CLUTCH AND BRAKE, final judgment adverse to the patentee was rendered Jan. 5, 1984, as to claims 15 and 16.
[*Official Gazette April 1, 1986.*]